United States Patent
Kola et al.

(10) Patent No.: US 10,341,327 B2
(45) Date of Patent: Jul. 2, 2019

(54) ENABLING SECURE CONNECTIONS BY MANAGING SIGNER CERTIFICATES

(71) Applicant: Bank of America Corporation, Charlotte, NC (US)

(72) Inventors: Bhanu Kumar Kola, Hyderabad (IN); Nikhil Reddy Kodari, Hyderabad (IN); Dharmalingam Ramasamy, Tiruppur (IN)

(73) Assignee: Bank of America Corporation, Charlotte, NC (US)

( * ) Notice: Subject to any disclaimer, the term of this patent is extended or adjusted under 35 U.S.C. 154(b) by 216 days.

(21) Appl. No.: 15/370,643

(22) Filed: Dec. 6, 2016

(65) Prior Publication Data

US 2018/0159837 A1 Jun. 7, 2018

(51) Int. Cl.
| | |
|---|---|
| *G06F 7/04* | (2006.01) |
| *G06F 15/16* | (2006.01) |
| *G06F 17/30* | (2006.01) |
| *H04L 29/06* | (2006.01) |
| *H04L 9/32* | (2006.01) |

(52) U.S. Cl.
CPC ........ *H04L 63/0823* (2013.01); *H04L 9/3268* (2013.01)

(58) Field of Classification Search
CPC . H04L 9/3268; H04L 9/3263; H04L 63/0823; H04L 63/068
See application file for complete search history.

(56) References Cited

U.S. PATENT DOCUMENTS

| | | | |
|---|---|---|---|
| 6,301,658 B1 | 10/2001 | Koehler | |
| 7,484,089 B1 | 1/2009 | Kogen et al. | |
| 7,930,415 B2 | 4/2011 | Gupta et al. | |
| 8,458,455 B2 | 6/2013 | Anderson et al. | |
| 8,473,735 B1 | 6/2013 | Jarvie et al. | |

(Continued)

OTHER PUBLICATIONS

IBM Knowledge Center; Websphere Application Server 7.0.0.x; retrieved from the internet on May 24, 2017, https://www.ibm.com/support/knowledgecenter/SSEQTP_7.0.0/com.ibm.websphere.nd.doc/info/ae/ae/csec_sslcertmonitoring.htm; 2 pages.

*Primary Examiner* — Trong H Nguyen
(74) *Attorney, Agent, or Firm* — Michael A. Springs; Moore & Van Allen PLLC; James C. Edwards

(57) ABSTRACT

Embodiments provide a system for managing security certificates, thereby enabling secure connections between systems. Embodiments collect data; authenticate to a server comprising a keystore comprising a plurality of certificates and having a server configuration; determine keystore characteristics from the server configuration; and, using the keystore characteristics, verify certificate expiration details. The system may determine that at least one certificate in the keystore has expired; and, in response, remove the at least one expired certificate from the keystore of the server. The system may determine that a certificate has expired; receives expired certificate serial number identifying expired certificate; searches for servers storing copies of the expired certificate; determines servers storing copies of the expired certificate; selects one or more of the servers storing copies of the expired certificate; and removes the expired certificate from the selected servers. The system may add the signer certificate to a keystore of the selected servers.

14 Claims, 7 Drawing Sheets

(56) References Cited

U.S. PATENT DOCUMENTS

| | | |
|---|---|---|
| 8,560,851 B1 | 10/2013 | Cherukumudi et al. |
| 8,719,908 B1 | 5/2014 | Boniface et al. |
| 8,776,192 B2 | 7/2014 | Schiefelbein |
| 9,252,958 B1 | 2/2016 | Tempel et al. |
| 9,515,999 B2 | 12/2016 | Ylonen |
| 2002/0184493 A1 | 12/2002 | Rees |
| 2003/0177352 A1 | 9/2003 | Camenisch et al. |
| 2003/0236977 A1 | 12/2003 | Levas et al. |
| 2005/0081037 A1 | 4/2005 | Kumagai et al. |
| 2005/0125656 A1 | 6/2005 | Mallal et al. |
| 2005/0076203 A1 | 7/2005 | Thornton et al. |
| 2006/0143443 A1 | 6/2006 | Cohen et al. |
| 2006/0168444 A1 | 7/2006 | Miller et al. |
| 2006/0259771 A1 | 11/2006 | Beuque et al. |
| 2007/0005956 A1 | 1/2007 | Zilinskas et al. |
| 2007/0113074 A1 | 5/2007 | Ben-Menahem et al. |
| 2011/0116637 A1* | 5/2011 | Schiefelbein ........... H04L 63/06 380/286 |
| 2011/0161662 A1 | 6/2011 | Lee et al. |
| 2012/0179907 A1 | 7/2012 | Byrd et al. |
| 2015/0222604 A1 | 8/2015 | Ylonen |
| 2018/0097803 A1* | 4/2018 | Iwanir ................. H04L 63/0823 |

\* cited by examiner

ENABLING SECURE CONNECTIONS BY MANAGING SIGNER CERTIFICATES

BACKGROUND

Digital certificates expire after time and different servers have different authentication protocols for logging on and accessing certificates in order to determine whether any have expired or will expire in the near future. Thus, a need exists for a management tool for managing certificates by updating expired certificates among many disparate servers.

BRIEF SUMMARY

Embodiments of the present invention address these and/or other needs by providing an innovative system for managing certificates such as signer certificates, thereby enabling secure connections.

Embodiments of the invention include a system including a memory device; a network communication interface; and a processing device operatively coupled to the memory device and the network communication interface, wherein the processing device is configured to execute computer-readable program code to collect data; authenticate to a server comprising a keystore comprising a plurality of certificates and having a server configuration; determine keystore characteristics from the server configuration; and, using the keystore characteristics, verify certificate expiration details. In some embodiments, the processing device is further configured to execute computer-readable program code to determine that at least one certificate in the keystore has expired; in response, remove the at least one expired certificate from the keystore of the server. In some embodiments, the processing device is further configured to execute computer-readable program code to determine that a certificate has expired; receive expired certificate serial number identifying expired certificate; search for servers storing copies of the expired certificate; determine servers storing copies of the expired certificate; select one or more of the servers storing copies of the expired certificate; and remove the expired certificate from the selected servers. In some embodiments, the processing device is further configured to execute computer-readable program code to select one or more servers and at least one signer certificate stored thereon; receive an add command corresponding to the selected servers and signer certificate; and, in response, add the signer certificate to a keystore of the selected servers.

In some such embodiments, the processing device is further configured to execute computer-readable program code to determine whether the addition of the signer certificate was successful; if so, select the servers on which the signer certificate was added; and verify the signer certificate was effectively stored on the servers.

In other such embodiments, the processing device is further configured to execute computer-readable program code to determine whether the addition of the signer certificate was successful; if not, access action logs corresponding to the addition of the signer certificate; determine one or more causes for the failure of the addition; and, in response, retry to add the signer certificate to the keystore of the selected servers.

In some embodiments, the certificates comprise signer certificates.

In some embodiments, the processing device is further configured to execute computer-readable program code to receive at least one certificate serial number identifying at least one certificate; search for servers storing copies of the at least one certificate; determine servers storing copies of the at least one certificate; select one or more of the servers storing copies of the at least one certificate; and remove the at least one certificate from the selected servers.

In some embodiments, the processing device is further configured to execute computer-readable program code to perform an audit of a plurality of servers; select one or more of the servers having at least one keystore; scan the at least one keystore of the selected servers to verify a status of the at least one keystore; and determine whether any of the at least one keystores are orphaned keystores. In some such embodiments, the processing device is further configured to execute computer-readable program code to if any of the at least one keystores are orphaned keystores, receive user input indicating whether the keystore should be removed; if so, remove the keystore and verify the removal; and if not, end the process. In other such embodiments, the processing device is further configured to execute computer-readable program code to, if none of the keystores are orphaned keystores, end the process.

Embodiments of the invention include a computer program product for managing security certificates, the computer program product comprising at least one non-transitory computer readable medium having computer-readable program code portions embodied therein, the computer-readable program code portions comprising an executable portion configured for collecting data; an executable portion configured for authenticating to a server comprising a keystore comprising a plurality of certificates and having a server configuration; an executable portion configured for determining keystore characteristics from the server configuration; and an executable portion configured for, using the keystore characteristics, verifying certificate expiration details.

In some of those embodiments, the computer-readable program code portions further comprise an executable portion configured for determining that at least one certificate in the keystore has expired; an executable portion configured for, in response, remove the at least one expired certificate from the keystore of the server. In other embodiments, the computer-readable program code portions further comprise an executable portion configured for determining that a certificate has expired; an executable portion configured for receiving expired certificate serial number identifying expired certificate; an executable portion configured for searching for servers storing copies of the expired certificate; an executable portion configured for determining servers storing copies of the expired certificate; an executable portion configured for selecting one or more of the servers storing copies of the expired certificate; and an executable portion configured for removing the expired certificate from the selected servers.

In some embodiments, the computer-readable program code portions further comprise an executable portion configured for selecting one or more servers and at least one signer certificate stored thereon; an executable portion configured for receiving an add command corresponding to the selected servers and signer certificate; and an executable portion configured for, in response, adding the signer certificate to a keystore of the selected servers. In some such embodiments, the computer-readable program code portions further comprise an executable portion configured for determining whether the addition of the signer certificate was successful; an executable portion configured for, if so, selecting the servers on which the signer certificate was added; and an executable portion configured for verifying the signer certificate was effectively stored on the servers. In other such embodiments, the computer-readable program code portions further comprise an executable portion configured for determining whether the addition of the signer certificate was successful; an executable portion configured for, if not, access action logs corresponding to the addition of the signer certificate; an executable portion configured for determining one or more causes for the failure of the addition; and an executable portion configured for, in response, retry to add the signer certificate to the keystore of the selected servers.

In some embodiments, the certificates comprise signer certificates.

Embodiments of the invention include a method for managing security certificates, the method comprising collecting data; authenticating to a server comprising a keystore comprising a plurality of certificates and having a server configuration; determining keystore characteristics from the server configuration; and, using the keystore characteristics, verifying certificate expiration details; wherein the certificates comprise signer certificates.

In some of those embodiments, the method includes determining that at least one certificate in the keystore has expired; in response, removing the at least one expired certificate from the keystore of the server. In some embodiments, the method includes determining that a certificate has expired; receiving expired certificate serial number identifying expired certificate; searching for servers storing copies of the expired certificate; determining servers storing copies of the expired certificate; selecting one or more of the servers storing copies of the expired certificate; and removing the expired certificate from the selected servers.

In some embodiments, the method includes selecting one or more servers and at least one signer certificate stored thereon; receiving an add command corresponding to the selected servers and signer certificate; and, in response, adding the signer certificate to a keystore of the selected servers. In some such embodiments, the method includes determining whether the addition of the signer certificate was successful; if so, selecting the servers on which the signer certificate was added; and verifying the signer certificate was effectively stored on the servers.

In some embodiments, the method includes determining her the addition of the signer certificate was successful; if not, accessing action logs corresponding to the addition of the signer certificate; determining one or more causes for the failure of the addition; and, in response, retrying to add the signer certificate to the keystore of the selected servers.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
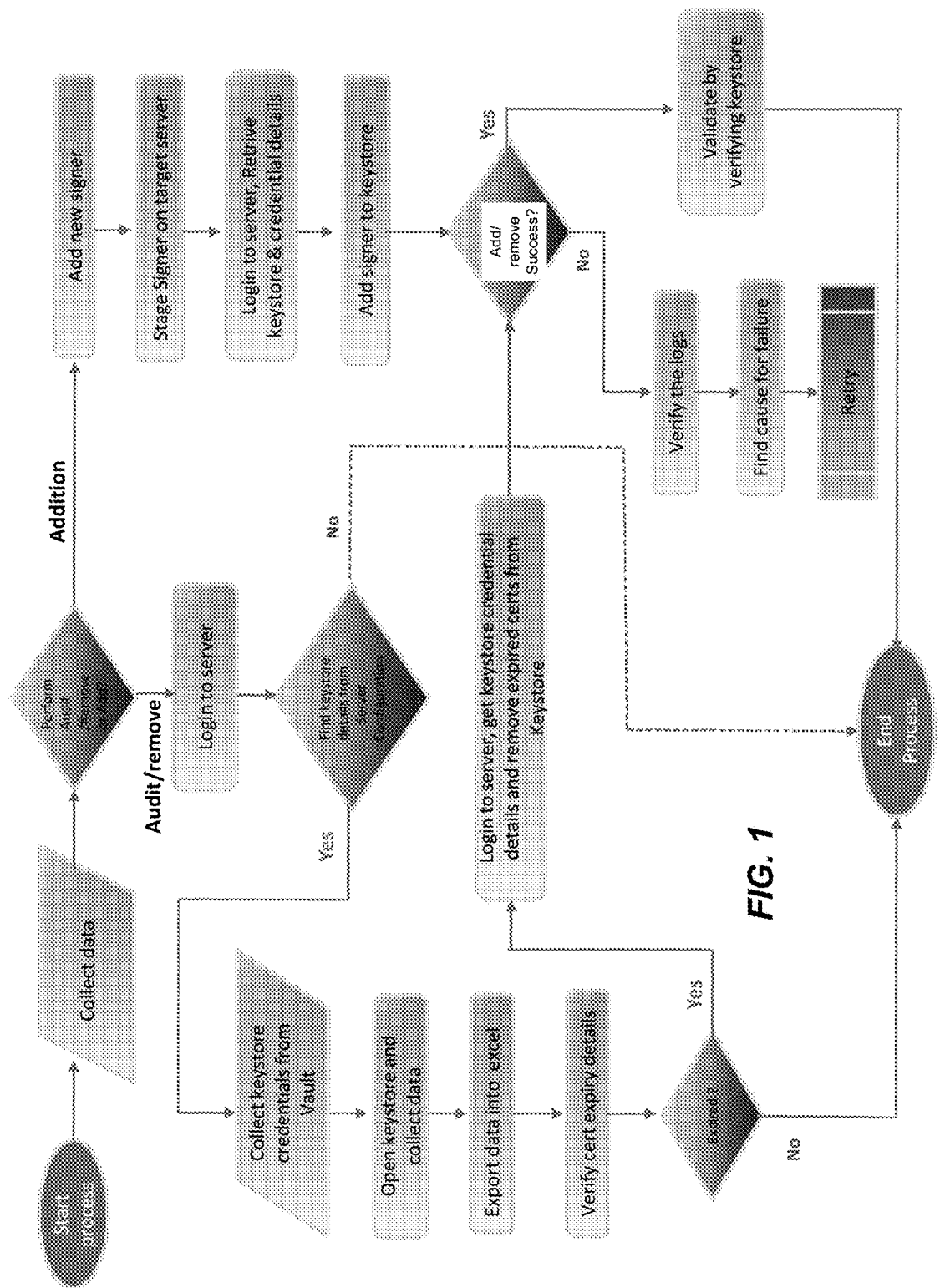

Having thus described embodiments of the invention in general terms, reference will now be made the accompanying drawings, wherein:

FIG. 1 is a flowchart illustrating a first method for managing certificates according to embodiments of the invention.

Figure 2A:
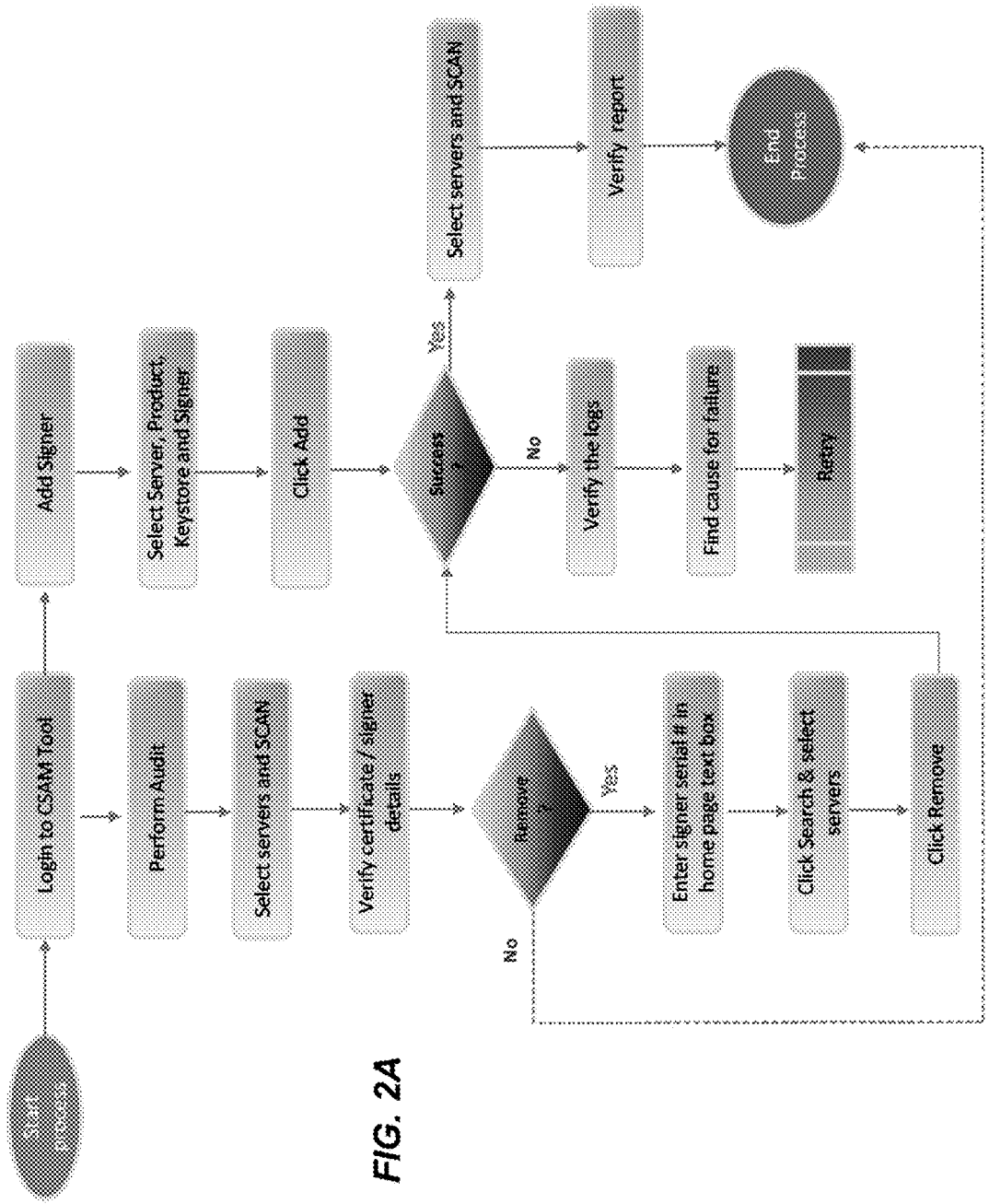

FIG. 2A is a flowchart illustrating a second, novel method for managing certificates according to embodiments of the invention.

Figure 2B:
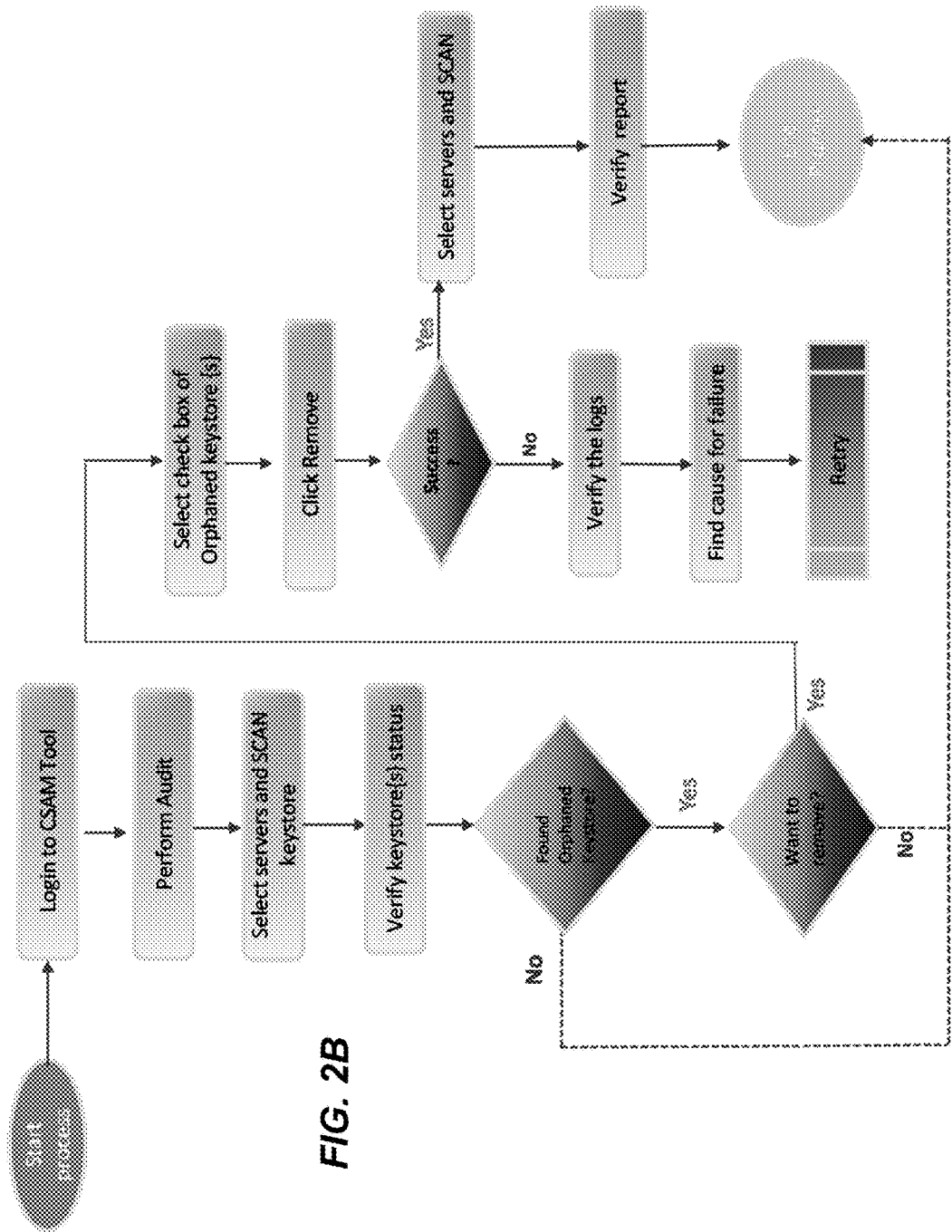

FIG. 2B is a flowchart illustrating a third, novel method for managing certificates according to embodiments of the invention.

Figure 3:
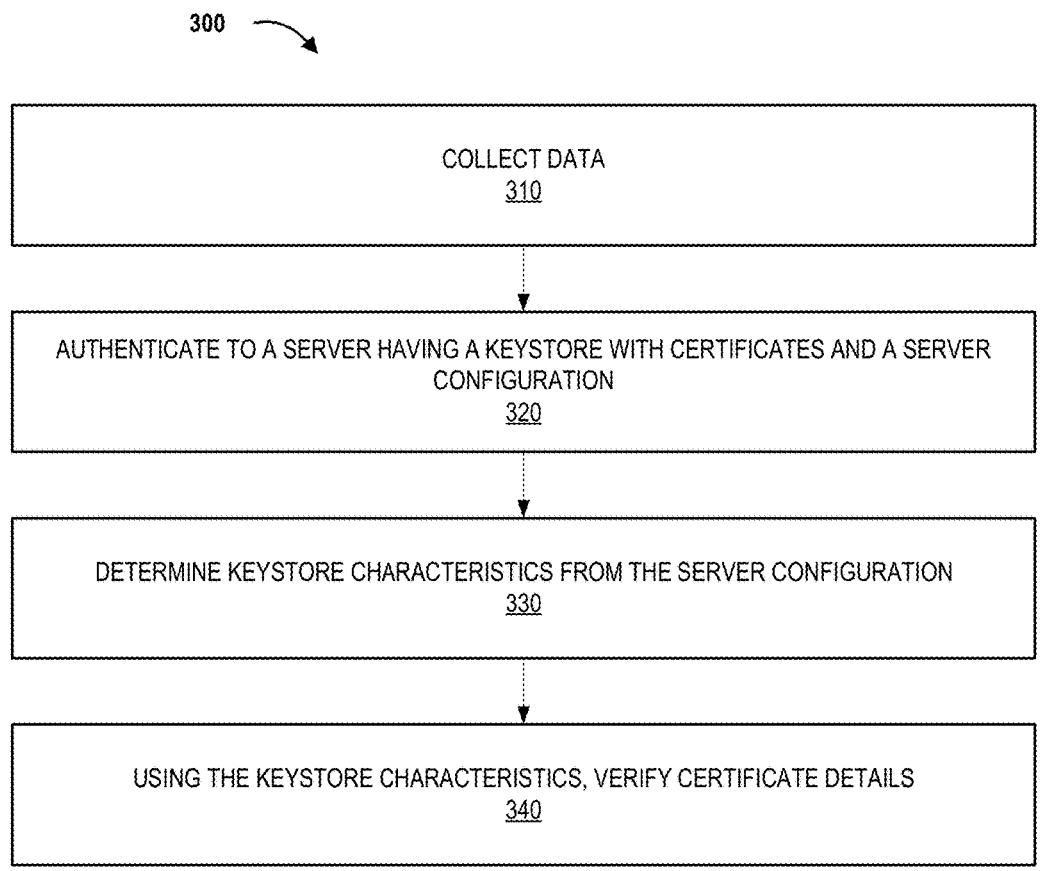

FIG. 3 is a flowchart illustrating a method for managing certificates according to embodiments of the invention.

Figure 4:
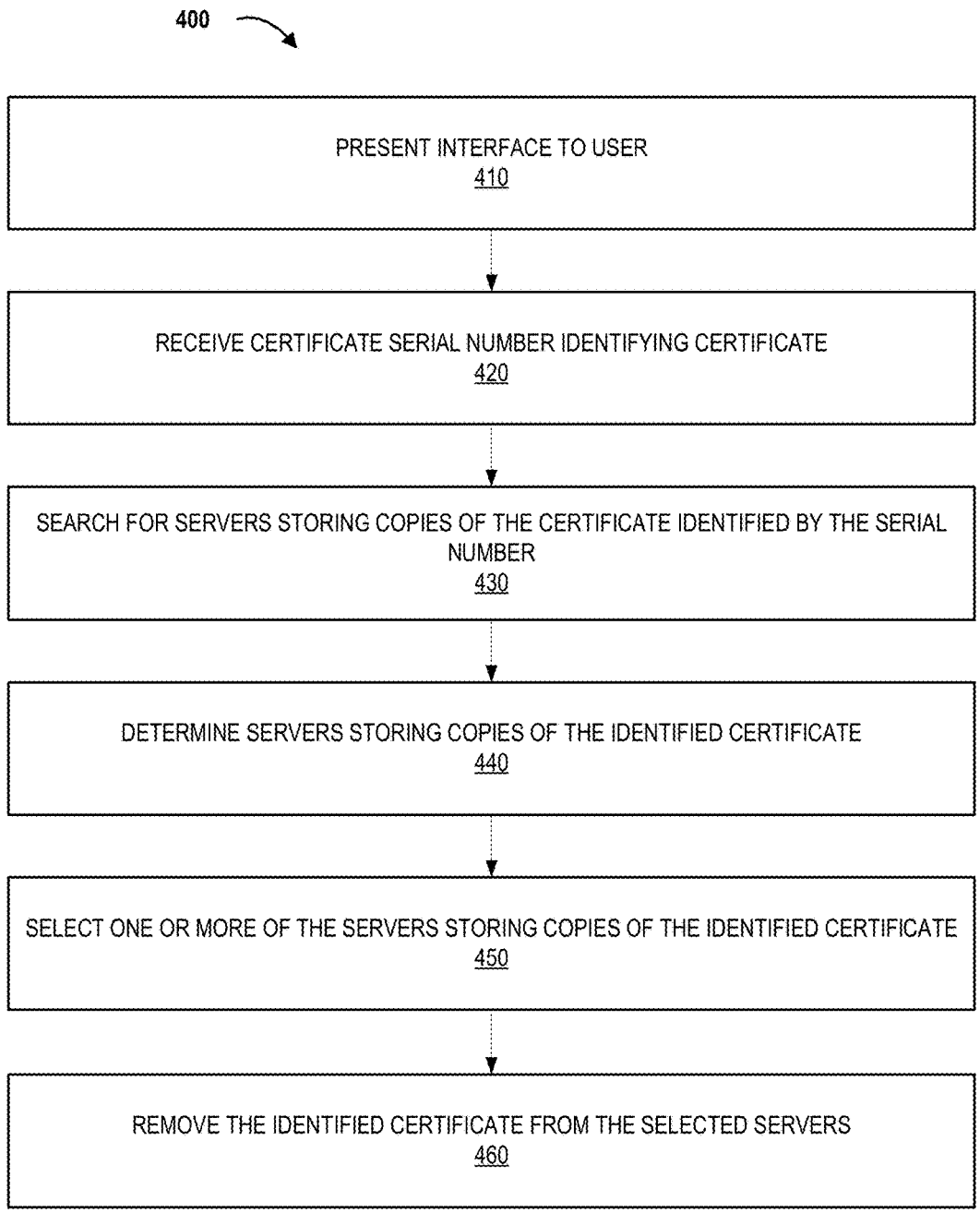

FIG. 4 is a flowchart illustrating a method for managing certificates according to embodiments of the invention.

Figure 5:
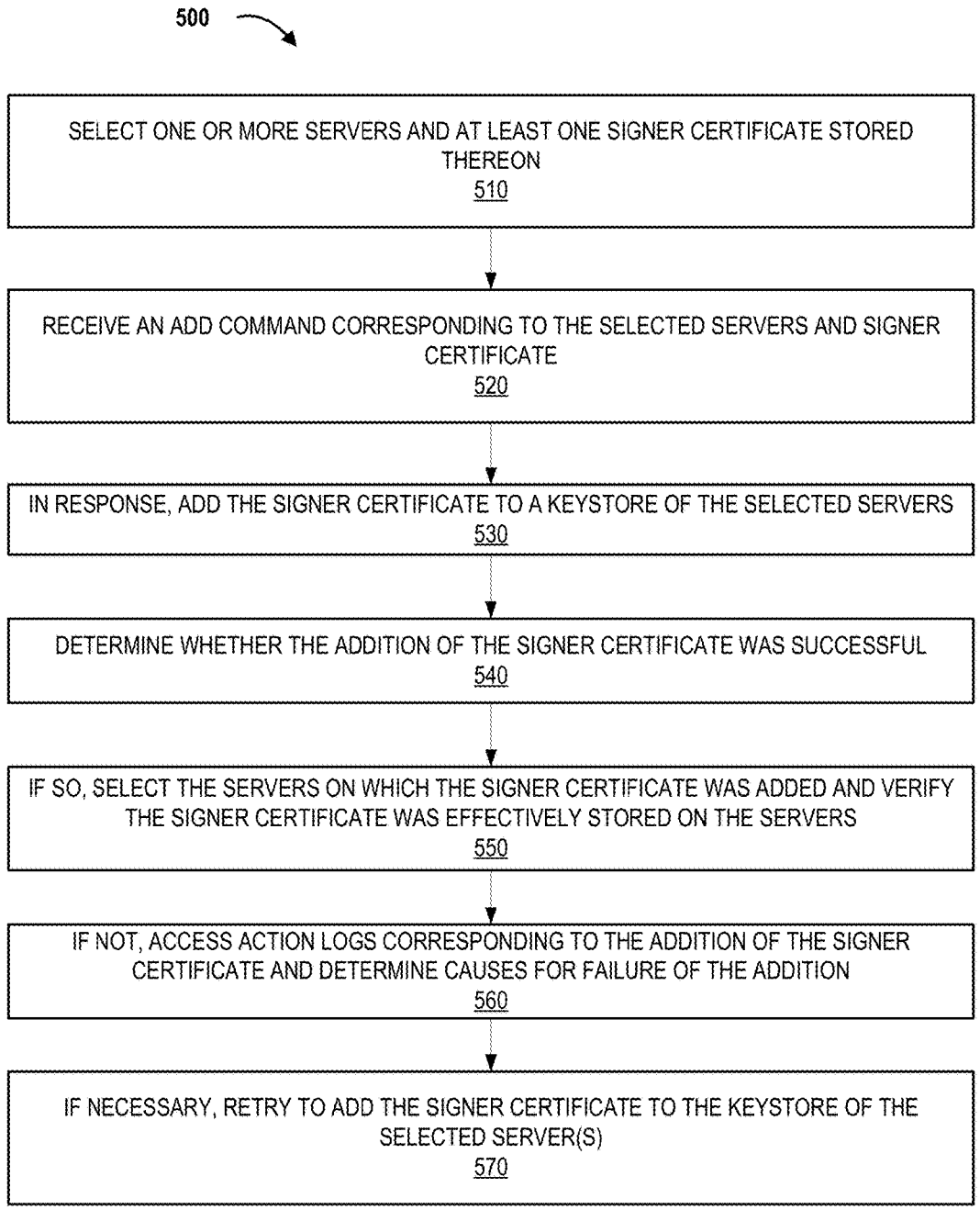

FIG. 5 a flowchart illustrating a method for managing certificates according to embodiments of the invention.

Figure 6:
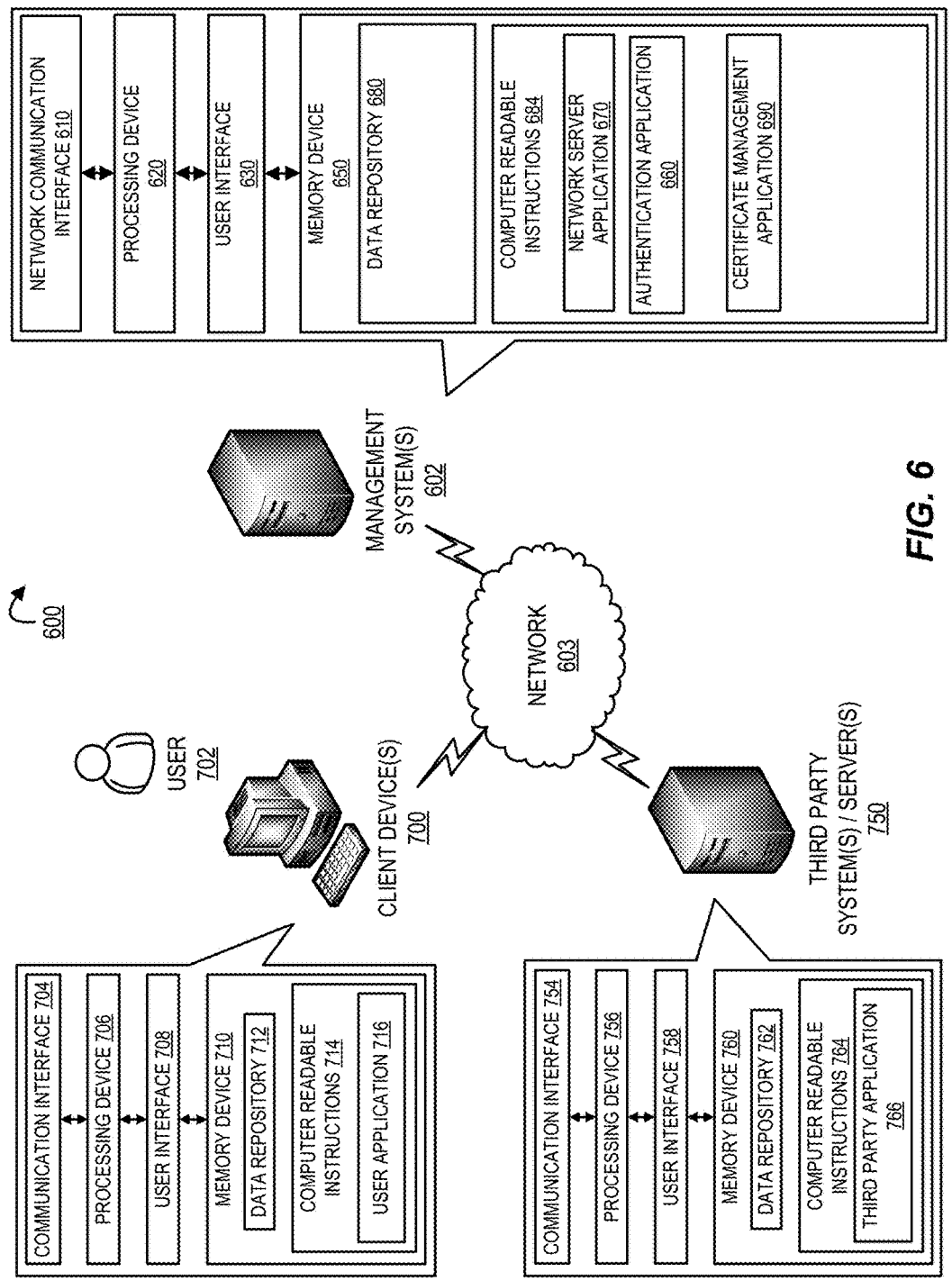

FIG. 6 is an illustration of an environment in which systems according to embodiments of the invention operate.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

A "user" may be a financial institution customer (e.g., an account holder or a person who have an account (e.g., banking account, credit account, or the like)). In some embodiments, a "user" may be a financial institution employee (e.g., an underwriter, a project manager, an IT specialist, a manager, an administrator, an internal operations analyst, bank teller or the like) capable of operating the system described herein. For purposes of this invention, the term "user" and "customer" may be used interchangeably. Furthermore, as used herein the term "user device" may refer to any device that employs a processor and memory and can perform computing functions, such as a personal computer or a mobile device, wherein a mobile device is any mobile communication device, such as a cellular telecommunications device (i.e., a cell phone or mobile phone), personal digital assistant (PDA), a mobile Internet accessing device, or other mobile device. Other types of mobile devices may include portable digital assistants (PDAs), pagers, wearable devices, mobile televisions, gaming devices, laptop computers, cameras, video recorders, audio/video player, radio, global positioning system (GPS) devices, or any combination of the aforementioned.

Embodiments provide a system for managing security certificates, thereby enabling secure connections between systems. Embodiments collect data; authenticate to a server comprising a keystore comprising a plurality of certificates and having a server configuration; determine keystore characteristics from the server configuration; and, using the keystore characteristics, verify certificate expiration details. The system may determine that at least one certificate in the keystore has expired; and, in response, remove the at least one expired certificate from the keystore of the server. The system may determine that a certificate has expired; receives expired certificate serial number identifying expired certificate; searches for servers storing copies of the expired certificate; determines servers storing copies of the expired certificate; selects one or more of the servers storing copies of the expired certificate; and removes the expired certificate from the selected servers. The system may add the signer certificate to a keystore of the selected servers.

In some such cases, the system may determine whether the addition of the signer certificate was successful; if so, select the servers on which the signer certificate was added; and verify the signer certificate was effectively stored on the servers. In other such cases, the system may determine whether the addition of the signer certificate was successful; if not, access action logs corresponding to the addition of the signer certificate; determine one or more causes for the failure of the addition; and, in response, retry to add the signer certificate to the keystore of the selected servers.

In various embodiments, the certificates include or are signer certificates.

Typical security protocols such as the Transport Layer Security (TLS) and its predecessor, Secure Sockets Layer (both referred to collectively as "SSL") are cryptographic protocols that provide communications security over a computer network. They work to provide privacy and data integrity between two communicating computer applications. SSL aims to secure connections between a client (such as a web browser) and a server (such as a website) and does so in a variety of ways. For example, SSL may utilize symmetric cryptography to encrypt the data that is transmitted. The keys for such symmetric encryption are typically generated uniquely for each connection and are based on a shared secret that may be "negotiated" during an initial communication sometimes referred to as a handshake protocol. In this regard, the client and the server "negotiate" the details of which encryption algorithm and cryptographic keys will be used during the data communication. This handshake protocol using a shared secret is secure because the negotiated secret is unavailable to eavesdroppers and cannot be obtained. The handshake is also reliable as no attacker can modify the communications during the negotiation without being detected. As another example, SSL may authenticate the identity of the communicating parties using public-key cryptography. Such authentication may be optional, but is generally required for at least one party, typically the server party. Finally, as another example, SSL may employ a connection that ensure integrity because each message transmitted includes a message integrity check using a message authentication code (MAC) to prevent undetected loss or alteration of the data during transmission.

A digital certificate certifies the ownership of a public key by the named subject of the certificate and also indicates certain expected usages of that key. The enables others, such as clients, to rely on the signatures or on assertions made by the private key that corresponds to the certified public key. SSL typically relies on a set of trusted third-party certificate authorities (CAs) to establish the authenticity of certificates. In some cases, a list of certificates may be distributed with user agent software and can be modified by a relying party to include or exclude specific certificates. Depending on the type of certificates used, typically existence of CAs and a public key infrastructure are necessary to verify the relation between a certificate and its owner and also to generate, sign and administer the validity of certificates.

During an SSL connection, a server sends its personal certificate to the client. The server's personal certificate contains both a private key and a public key. The public key, which is also called the "signer certificate", may be extracted to a file and may be imported into a keystore or "truststore". A truststore generally contains the signer certificates which the client trusts when making connections or accepting connections. In order to complete the SSL connection, the client must have the correct signer certificate to match the server's personal certificate.

Thus, in the SSL security world, digital certificates and corresponding signer certificates play a vital role in establishing a secure connection between client and server. All SSL keystores should have valid digital certificates and signer certificates to properly enable secure communications. If any keystore with expired digital certificates or signer certificates might cause the node (i.e., server) to fail. Current industry tools do not provide real-time expiration details of all available digital certificates and signer certificates from all keystores from all targeted servers. Fetching these details manually is a major time drain and may open the process to introduction of errors. No current tools provide auditing, reporting, removal of expired digital certificate, expired signer certificates, or expired keystores and addition of new signer certificates on target servers.

Embodiments of the present invention provide these benefits and others using an automation tool that connects to all servers and creates a comprehensive view of all digital certificates and signer certificates through a comprehensive user portal. If any signer certificates or digital certificates are expired, the corresponding information is marked for indicating the expiration (such as by marking red), and if any signer or digital certificates are expiring in sixty (60) days or some other time period, the corresponding information is marked for indicating the upcoming expiration (such as by marking yellow). The portal may also show any orphaned keystores (unreferenced keystore(s) on any middleware/applications) where users can perform certain actions (such as ignoring the orphaned keystores or removing orphaned keystores by the interface console).

Further, embodiments of the invention may remove any certificates based on serial numbers. In some cases, embodiments of the invention may perform cleanup of expired certificates from all keystores and/or delete unrequired certificates by confirming whether certificate serial numbers are valid (i.e., non-expired) and/or specified for removal (e.g., serial number(s) selected by a user for removal, regardless of whether such serial numbers correspond to expired or non-expired certificates). The invention keeps a history of events (such as adding and/or removing SSL digital certificates from the last ninety (90) days). The invention can add signer certificates in a selected target server by enabling certificate details in the interface.

In some embodiments, the tool connects to all servers and creates a comprehensive view of all certificates through an automatic probe, which scans the entire server and discovers every certificate related to middleware products and perform required actions. Thus, the tool logs in to all servers and scans their keystores. It also flags unreferenced keystores on middleware products/applications and prompts the user for necessary or suggested actions. As another feature, users may perform ad-hoc addition and/or removal of any signer certificate explicitly. These functions may be performed on numerous different products or server protocols.

In historical systems, updating of certificates, and namely updating of signer certificates requires a time consuming and resource-intensive interaction among users, interface systems and the networks of servers. Embodiments of the present invention, on the other hand, enables more efficient processing of signer certificate management, including removing desired signer certificates and/or installing new signer certificates, by providing a sequential process for querying all servers on the networks for information on signer certificates in a simultaneous or substantially simultaneous fashion and presenting a comprehensive view of all the servers' certificates to an administrator. The administrator may select one or more digital certificates or signer certificates to remove or otherwise modify based on serial number, the invention may then perform the desired request for each of the identified certificates, confirm success, troubleshoot and retry, if necessary. In some embodiments, the system automatically performs one or more actions on the comprehensive set of server certificates, such as for example, removing all expired certificates or removing all certificates having a particular serial number. Then, comprehensive reporting functions may be used to communicate results to the administrator and/or others. Once the servers have valid certificates, they may effectively form secure connections from other systems or servers.

Accordingly, embodiments of the invention solve the technological problem of how to remove and otherwise manage both digital certificates and signer certificates efficiently and accurately from a centralized control station. The invention solves this technological problem by implementing effective network connections and enabling authentication with regard to the multiple network servers from the central control station, thereby enabling the invention to query all servers and present a comprehensive view of certificate status. After which, the invention may, either in response to administrator input or automatically perform one or more actions related to certificates, which may be done by identifying the certificates by serial number. Once the action(s) are taken, the servers are then in condition for establishing secure connections with other systems/servers because their digital and signer certificates have been managed effectively. Embodiments of this system, therefore, improve the processing and memory resources and efficiency necessary to query many servers for configurations, identify desired certificates and accurately perform actions regarding the identified certificates because the central control station processes the query for all servers simultaneously, indicates comprehensive results and performs desired actions comprehensively rather than in a piecemeal fashion, which, in previous cases has required significantly more processing and memory resources. This is, in part, due to the necessity of running multiple queries, individually identifying desired certificates and individually performing desired actions over and over and over for each server on the system. Thus, the interface or computing station(s) being used by administrators were occupied with these processes, in some situations, for many days in a row. Whereas, embodiments of the present invention, can query, display and perform desired actions in one, relatively short, computing session, thereby freeing formerly long-occupied computing resources for other projects.

Referring to FIG. 1, a flowchart illustrates a first method for managing certificates according to embodiments of the invention. The traditional process starts by collecting data and then performing an audit, removal or addition function. In the audit/remove function, the user must log-on to a single server by manually providing authentication credentials. Once the system is logged into the server, the system finds keystore details from a server configuration. If there is no keystore, then the process ends. If there is a keystore, then the system collects the keystore credentials from a vault. The system then opens the keystore and collects the data, exports the data into a viewing tool such as a spreadsheet and verifies certificate expiration details. If an expired certificate is present, then the system logs in to the server, gets the keystore credential details and removes the expired certificates from the keystore. Once the expired certificates are removed, the system may determine whether there was success in removing the expired certificate. If so, the certificate may be validated by verifying the keystore. If not, then the logs may be verified and the cause for the failure may be determined. Thereafter, the function may be retried. As another function, a new signer may be added by staging the signer on a target server. Then, the system must log-in to the server, retrieve keystore and credential details and add the signer certificate to the keystore. As discussed above regarding removals, the success of the addition of the signer certificate may be verified.

Referring now to FIG. 2A, a flowchart illustrates another embodiment of the invention. First, a user may log-in to the certificate signer auto-management tool as described herein and then select an audit of available servers or addition of a signer certificate. The audit functionality proceeds by selecting servers and scanning those servers to verify digital certificate (or signer certificate) details. Then, the system determines whether any certificates should be removed (e.g., because they are user-specified for removal and/or are expired). If certificates are to be removed, then the user may enter a serial number corresponding to a certificate. The system may then search and select the servers on which specified certificates exist and removes the specified certificates. Once the specified certificates are removed, the success of the removal is verified by selecting the appropriate servers and scanning them to verify removal of the specified certificates. If the removal of the specified certificates is not successful, then the action logs may be accessed and the cause(s) for the failure may be determined, and thereafter the removal of the certificate may be re-tried.

Another functionality of the system is adding a signer certificate to appropriate server(s). First, the server(s) are selected, the products are selected and the keystore and signer certificate are selected. Then the system adds the signer certificate to the appropriate server(s). As discussed above with regard to the removal of expired certificates, the system may verify success of addition of the signer certificate on the appropriate server(s).

Referring now to FIG. 2B, a flowchart illustrates a method for managing certificates according to embodiments of the invention. Namely, the method illustrated in FIG. 2B relates to identifying and removing orphaned keystores. First, the flowchart indicates logging-in to the certificate signer auto-management tool as described herein. Next, the system performs an audit, which may include collecting data and/or scanning any servers located and accessible to the system. Then, the system selects servers and scans the servers for keystores. Once keystores are identified on one or more servers, the status of the identified keystores may be verified, such as by determining whether the identified keystores are orphaned or not. If orphaned keystores are found, then the system may prompt the user to determine whether the user desires to remove the orphaned keystore(s). If so, then the system enables the user to select which orphaned keystore(s) to remove, performs the removal and then verifies whether the removal was successful. If so, servers may be selected and scanned and a verification report may be generated. If the removal of the selected orphaned keystores was unsuccessful, then action logs of the system may be checked and the cause(s) for failure may be determined using the action logs. Once the cause for failure is determined, the system may retry the removal of the selected orphaned keystores. If no orphaned keystores are found by the system or if the user does not desire to remove any identified orphaned keystores, then the process ends.

Referring now to FIG. 3, a flowchart illustrates a method for managing certificates. The first step, as represented by block 310, is to collect data, for example, from a plurality of servers with which the system is networked and tasked with managing certificates (i.e., digital certificates and/or signer certificates). The next step, as represented by block 320, is to authenticate to a server or multiple server, each having a keystore with certificates and a server configuration. The next step, as represented by block 330, is to determine keystore characteristics from the server configuration(s) of each of the server(s). Finally, as represented by step 340, the system uses the keystore characteristics to verify the certificate expiration details.

Referring now to FIG. 4, a method 400 is shown. The first step, as represented by block 410, is to present a user interface to the user. The next step, as represented by block 420, is to receive (e.g., from the user using the interface) a certificate serial number identifying a digital certificate. Next, as represented by block 430, is to search for server storing copies of the certificate identified by the serial number. Then, as represented by block 440, the system determines servers storing copies of the identified certificate. Next, as represented by block 450, is to select one or more of the servers storing copies of the identified certificate. Finally, as represented by block 460, is to remove the identified certificate from the selected servers.

In some embodiments such as those where the user is interested in identifying an removing expired certificates, the system determines that at least one certificate in a keystore has expired. The next step is to receive expired certificate serial number identifying the expired certificate(s). Then, the next step is to search for servers storing copies of expired certificate(s). Next, the system determines servers storing copies of the expired certificate. Next, the system selects one or more of the servers storing copies of the expired certificate. Finally, the system removes the expired certificate from the selected servers.

Referring now to FIG. 5, a flowchart illustrates a method 500 for managing certificates. First, as represented by block 510, the system selects one or more servers and at least one signer certificate stored thereon. Next, as represented by block 520, the system receives an add command corresponding to the selected servers and signer certificate. Next, as represented by block 530, the system, in response, adds the signer certificate to a keystore of the selected servers. Then, as represented by block 540, the system determines whether the additional of the signer certificate was successful. Then, as represented by block 550, if the addition of the signer certificate was successful, then the system selects the servers on which the signer certificate was added and verifies the signer certificate was effectively stored on the servers. Next, as represented by block 560, if the addition of the signer certificate was not successful, then the system accesses action logs corresponding to the addition of the signer certificate and determines the cause(s) for failure of the addition. Next, and finally, as represented by block 570, the system, if necessary, retries the addition of the signer certificate to the keystore of the selected server(s).

Referring to FIG. 6, a certificate management system environment 600 is illustrated, in accordance with some embodiments of the invention. The environment 600 includes a client device 700 associated or used with authorization of a user 702, a management system 602, and a third party system/server 750. As used herein, a "processing device," such as the processing devices 620, 706, and 756 generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may further include functionality to operate one or more software programs based on computer-executable program code thereof, which may be stored in a memory. As the phrase is used herein, a processing device may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "user interface" such as the user interfaces 630, 708, and 758 generally includes a plurality of interface devices and/or software that allow a customer to input commands and data to direct the processing device to execute instructions. For example, the user interfaces presented in FIG. 6 may include a graphical user interface (GUI) or an interface to input computer-executable instructions that direct the processing device to carry out specific functions. The user interface employs certain input and output devices to input data received from a user or output data to a user. These input and output devices may include a display, mouse, keyboard, button, touchpad, touch screen, microphone, speaker, LED, light, joystick, switch, buzzer, bell, and/or other customer input/output device for communicating with one or more customers.

As used herein, a "memory device" such as memory devices 650, 710, and 760 generally refers to a device or combination of devices that store one or more forms of computer-readable media for storing data and/or computer-executable program code/instructions. Computer-readable media is defined in greater detail below. For example, in one embodiment, the memory device includes any computer memory that provides an actual or virtual space to temporarily or permanently store data and/or commands provided to the processing device when it carries out its functions described herein.

As used herein, a "communication interface" generally includes a modem, server, transceiver, and/or other device for communicating with other devices on a network, and/or a user interface for communicating with one or more customers. Referring again to FIG. 6, the network communication interface 610 as well as communication interfaces 704 and 754 are communication interfaces having one or more communication devices configured to communicate with one or more other devices on a network, such as a mobile device, a personal computing device, a mobile banking system, other computing systems, other servers, and/or the like. The processing device is configured to use the network communication interface to transmit and/or receive data and/or commands to and/or from the other devices connected to the network.

The systems and devices communicate with one another over the network 603 and perform one or more of the various steps and/or methods according to embodiments of the disclosure discussed herein. The network 603 may include a local area network (LAN), a wide area network (WAN), and/or a global area network (GAN). The network 603 may provide for wireline, wireless, or a combination of wireline and wireless communication between devices in the network. In one embodiment, the network 130 includes the Internet.

The client device 700 includes a communication interface 704 communicably coupled with a processing device 706, which is also communicably coupled with a memory device 710. In some embodiments, the communication interface 704 may also comprise a GPS transceiver capable of determining a geographic location associated with the user device 700. The processing device 706 is configured to control the communication interface 704 such that the user device 700 communicates across the network 603 with one or more other systems. The processing device 706 is also configured to access the memory device 710 in order to read the computer readable instructions 714, which in some embodiments includes a user application 716. The user application 716 allows for communication of the user device 700 with the other systems and devices within the environment 600 such as the third party system 750, and financial institution system 602. The user application 716 allows the user 702 to receive information transmitted as well as input information requested by the other systems and communicate with a financial institution, one or more third parties, and/or other entities. The memory device 710 also includes a data repository 712 or database for storing pieces of data that can be accessed by the processing device 706.

The third party system(s)/server(s) 750 includes a communication interface 754 communicably coupled with a processing device 756, which is also communicably coupled with a memory device 760. The processing device 756 is configured to control the communication interface 754 such that the third party system 750 communicates across the network 603 with one or more other systems. The processing device 756 is also configured to access the memory device 760 in order to read the computer readable instructions 764, which in some embodiments includes a third party application 766. The third party application 766 allows for communication with the other systems and devices within the environment 600 such as the user device 700 and the financial institution system 602. The memory device 760 also includes a data repository 762 or database for storing pieces of data that can be accessed by the processing device 756.

The financial institution system 602 may be a single system or multiple systems networked with one another to perform one or more process steps discussed herein. As illustrated in FIG. 5, in one embodiment of the invention, the management system 602 includes a processing device 620 operatively coupled to a network communication interface 610 and a memory device 650. In certain embodiments, the management system 602 is operated by a first entity, such as a financial institution, while in other embodiments, the management system 602 is operated by an entity other than a financial institution.

It should be understood that the memory device 650 may include one or more databases or other data structures/repositories. The memory device 650 also includes computer-executable program code that instruct the processing device 620 to operate the network communication interface 610 to perform certain communication functions of the management system 602 described herein. For example, in one embodiment of the clearance tracking system environment 600, the memory device 650 includes, but is not limited to, a network server application 670, an authentication application 660, a data repository 680 a certificate management application 690, and other computer-executable instructions or other data. The computer-executable program code of the network server application 670, the certificate management application 690, may instruct the processing device 620 to perform certain logic, data-processing, and data-storing functions of the management system 602 described herein, as well as communication functions of the management system 602.

The user application 716, the third party application 766, the certificate management application 690, the network server application 670, the authentication application 660, are for instructing the processing devices on their respective systems to perform various steps of the methods discussed herein, and/or other steps and/or similar steps. In various embodiments, one or more of the various applications discussed are included in the computer readable instructions stored in a memory device of one or more systems or devices other than their respective systems and/or devices. For example, in some embodiments, the user application 716 is stored and configured for being accessed by a processing device of the management system 602 connected to the network 603. In various embodiments, the user application 716, the third party application 766, and the various applications stored on the management system 602 are stored and executed by different systems/devices. In some embodiments, the discussed applications may be similar and may be configured to communicate with one another. In some embodiments, the various applications may be considered to be working together as a singular application despite being stored and executed on different systems.

In various embodiments, one of the systems discussed above, such as the management system 602, is more than one system and the various components of the system are not collocated, and in various embodiments, there are multiple components performing the functions indicated herein as a single device. For example, in one embodiment, multiple processing devices perform the functions of the processing device 620 of the management system 602 described herein.

In various embodiments, the third party system 750, the management system 602, and the user device 700 and/or other systems may perform all or part of a one or more method or process steps discussed above and/or other method steps in association with the method steps discussed above. Furthermore, some or all the systems/devices discussed here, in association with other systems or without association with other systems, in association with steps being performed manually or without steps being performed manually, may perform one or more of the steps of one or more of the method discussed herein, or other methods, processes or steps discussed herein or not discussed herein.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for managing security certificates, the system comprising:
   a memory device;
   a network communication interface; and
   a processing device operatively coupled to the memory device and the network communication interface, wherein the processing device is configured to execute computer-readable program code to:
   collect data;
   in response to the collection, authenticate to a server comprising a keystore comprising a plurality of certificates and having a server configuration;
   in response to the authentication, determine keystore characteristics from the server configuration;
   using the determined keystore characteristics, verify certificate details;
   based on the verified certificate details, determine that at least one certificate in the keystore has expired;

in response to the determining that the at least one certificate in the keystore has expired, remove the at least one expired certificate from the keystore of the server;

receive at least one serial number identifying each of the at least one expired certificate;

search for other remote servers storing copies of the at least one expired certificate based on the received at least one serial number;

based on the search, determine other remote servers storing copies of the at least one expired certificate;

select one or more of the determined servers storing copies of the at least one expired certificate; and remove the at least one expired certificate from the selected one or more servers.

2. The system of claim 1, wherein the processing device is further configured to execute computer-readable program code to:

select one or more second servers and at least one signer certificate stored on the selected one or more second servers;

receive an add command corresponding to the selected one or more second servers and at least one signer certificate; and in response to the receiving the add command, add the at least one signer certificate to a keystore of the selected one or more second servers.

3. The system of claim 2, wherein the processing device is further configured to execute computer-readable program code to:

determine whether the addition of the at least one signer certificate was successful;

responsive to the determining that the addition of the at least one signer certificate was successful, select a set of servers on which the at least one signer certificate was added; and verify the at least one signer certificate was effectively stored on the selected set of servers.

4. The system of claim 2, wherein the processing device is further configured to execute computer-readable program code to:

determine whether the addition of the at least one signer certificate was successful;

responsive to the determining that the addition of the at least one signer certificate was unsuccessful, access action logs corresponding to the addition of the at least one signer certificate;

determine one or more causes for the unsuccessful addition; and in response to the determining the one or more causes for the unsuccessful addition, retry to add the at least one signer certificate to the keystore of the selected one or more second servers.

5. The system of claim 1, wherein the plurality of certificates comprise signer certificates.

6. The system of claim 1, wherein the processing device is further configured to execute computer-readable program code to:

receive at least one certificate serial number identifying at least one certificate;

search for servers storing copies of the at least one certificate;

determine servers storing copies of the at least one certificate;

select one or more of the servers determined to be storing copies of the at least one certificate; and remove the at least one certificate from the selected one or more servers determined to be storing the copies of the at least one certificate.

7. The system of claim 1, wherein the processing device is further configured to execute computer-readable program code to:

perform an audit of a plurality of servers;

select one or more of the plurality of servers having at least one keystore;

scan the at least one keystore of the selected one or more of the plurality of servers to verify a status of the at least one keystore; and determine whether any of the at least one keystore are orphaned keystores.

8. The system of claim 7, wherein the processing device is further configured to execute computer-readable program code to:

responsive to the determining that any of the at least one keystore are orphaned keystores:

receive user input indicating that the orphaned keystores should be removed; and remove the orphaned keystores and verify the removal of the orphaned keystores.

9. A computer program product for managing security certificates, the computer program product comprising at least one non-transitory computer readable medium having computer-readable program code portions embodied therein, the computer-readable program code portions comprising:

an executable portion configured for collecting data;

an executable portion configured for, in response to the collection, authenticating to a server comprising a keystore comprising a plurality of certificates and having a server configuration;

an executable portion configured for, in response to the authentication, determining keystore characteristics from the server configuration;

an executable portion configured for, using the determined keystore characteristics, verifying certificate details;

an executable portion configured for, based on the verified certificate details, determining that at least one certificate in the keystore has expired;

an executable portion configured for, in response to the determining that the at least one certificate in the keystore has expired, removing the at least one expired certificate from the keystore of the server;

an executable portion configured for receiving at least one serial number identifying each of the at least one expired certificate;

an executable portion configured for searching for other remote servers storing copies of the at least one expired certificate based on the received at least one serial number;

an executable portion configured for, based on the search, determining other remote servers storing copies of the at least one expired certificate;

an executable portion configured for selecting one or more of the determined servers storing copies of the at least one expired certificate; and an executable portion configured for removing the at least one expired certificate from the selected one or more servers.

10. The computer program product of claim 9, wherein the computer-readable program code portions further comprise:

an executable portion configured for selecting one or more second servers and at least one signer certificate stored on the selected one or more second servers;

an executable portion configured for receiving an add command corresponding to the selected one or more second servers and at least one signer certificate; and an executable portion configured for, in response to the receiving the add command, adding the at least one signer certificate to a keystore of the selected one or more second servers.

11. The computer program product of claim 10, wherein the computer-readable program code portions further comprise:

an executable portion configured for determining whether the addition of the at least one signer certificate was successful;

an executable portion configured for, responsive to the determining that the addition of the at least one signer certificate was successful, selecting a set of servers on which the at least one signer certificate was added; and an executable portion configured for verifying the at least one signer certificate was effectively stored on the selected set of servers.

12. The computer program product of claim 11, wherein the computer-readable program code portions further comprise:

an executable portion configured for determining whether the addition of the at least one signer certificate was successful;

an executable portion configured for, responsive to the determining that the addition of the at least one signer certificate was unsuccessful, accessing action logs corresponding to the addition of the at least one signer certificate;

an executable portion configured for determining one or more causes for the unsuccessful addition; and an executable portion configured for, in response to the determining the one or more causes for the unsuccessful addition, retrying to add the at least one signer certificate to the keystore of the selected one or more second servers.

13. The computer program product of claim 9, wherein the plurality of certificates comprise signer certificates.

14. A computer-implemented method for managing security certificates, the method comprising:

collecting data;

in response to the collection, authenticating to a server comprising a keystore comprising a plurality of certificates and having a server configuration;

in response to the authentication, determining keystore characteristics from the server configuration; and using the determined keystore characteristics, verifying certificate details;

based on the verified certificate details, determining that at least one certificate in the keystore has expired;

in response to the determining that the at least one certificate in the keystore has expired, removing the at least one expired certificate from the keystore of the server;

receiving at least one serial number identifying each of the at least one expired certificate;

in response to the receiving, searching for other remote servers storing copies of the at least one expired certificate based on the received at least one serial number;

based on the search, determining other remote servers storing copies of the at least one expired certificate;

selecting one or more of the determined servers storing copies of the at least one expired certificate; and removing the at least one expired certificate from the selected one or more servers, wherein the plurality of certificates comprise signer certificates.

\* \* \* \* \*